(12) United States Patent
Virnig et al.

(10) Patent No.: US 6,210,647 B1
(45) Date of Patent: *Apr. 3, 2001

(54) PROCESS OF RECOVERY OF METALS FROM AQUEOUS AMMONIACAL SOLUTIONS EMPLOYING AN AMMONIA ANTAGONIST HAVING ONLY HYDROGEN BOND ACCEPTOR PROPERTIES

(75) Inventors: Michael J. Virnig; Gary A. Kordosky; George A. Wolfe, all of Tucson, AZ (US); J. Murdoch MacKenzie, Victoria (AU)

(73) Assignee: Henkel Corporation, Gulph Mills, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,276

(22) Filed: Nov. 21, 1997

Related U.S. Application Data

(60) Provisional application No. 60/034,440, filed on Dec. 23, 1996.

(51) Int. Cl.[7] .......................... C22B 15/00; C22B 19/00; C22B 23/00; C09K 3/00
(52) U.S. Cl. .......................... 423/24; 423/99; 423/139; 252/184; 205/581; 205/590; 205/605
(58) Field of Search .................. 423/24, 99, 139, 423/DIG. 14; 252/184; 205/581, 590, 605

(56) References Cited

U.S. PATENT DOCUMENTS

| | | | |
|---|---|---|---|
| 3,428,449 | 2/1969 | Swanson et al. | 17/117 |
| 3,907,966 | 9/1975 | Skarbo | 423/139 |
| 3,952,775 | 4/1976 | Ogata | 137/625.38 |
| 3,981,969 | 9/1976 | Uitti | 423/139 |
| 3,988,151 | 10/1976 | Skarbo et al. | 75/119 |
| 4,020,105 | 4/1977 | Ackerley et al. | 260/566 |
| 4,020,106 | 4/1977 | Ackerley et al. | 260/566 |
| 4,029,704 | 6/1977 | Anderson | 260/566 |
| 4,085,146 | 4/1978 | Beswick | 260/600 |
| 4,222,832 | 9/1980 | Hubred et al. | 204/106 |
| 4,350,667 | 9/1982 | Andersson et al. | 423/24 |
| 4,507,268 | 3/1985 | Kordosky et al. | . |
| 4,544,532 | 10/1985 | Kordosky et al. | 252/182 |
| 4,582,689 | 4/1986 | Kordosky | 423/24 |
| 5,174,812 | 12/1992 | Price et al. | . |
| 5,470,552 | 11/1995 | Kordosky et al. | . |
| 5,654,458 | 8/1997 | Fabiano et al. | 556/136 |

FOREIGN PATENT DOCUMENTS

| | | | |
|---|---|---|---|
| 1062474 | 9/1979 | (CA) | . |
| 132532 | 6/1921 | (GB) | . |
| 1608122 | * 11/1990 | (SU) | 423/99 |

* cited by examiner

*Primary Examiner*—Steven Bos
(74) *Attorney, Agent, or Firm*—John E. Drach; Patrick J. Span

(57) ABSTRACT

An improved process for the extraction of a metal from an aqueous ammoniacal solution comprising:

(i) contacting the aqueous ammoniacal solution with an extraction reagent comprised of a water insoluble extractant for the metal, to provide an organic phase, now containing metal values, and an aqueous phase from which metal values have been extracted;

(ii) contacting the organic phase with an aqueous stripping solution to provide an aqueous strip phase, now containing metal values, and an organic phase from which metal values have been stripped; and (iii) recovering the metal values from the aqueous stripping solution;

the improvement wherein (a) the extraction reagent contains an ammonia antagonist having only hydrogen bond acceptor properties; (b) the stripping solution is an aqueous highly acidic solution; and (c) the organic phase is washed with a weakly acidic aqueous solution prior to stripping with the highly acidic aqueous stripping solution. The extractant is preferably an oxime extractant, either a ketoxime or an aldoxime. The preferred hydrocarbon solvent is kerosene and the preferred antagonist is 2,2,4-trimethylpentane-1,3-diol diisobutyrate.

28 Claims, No Drawings

PROCESS OF RECOVERY OF METALS FROM AQUEOUS AMMONIACAL SOLUTIONS EMPLOYING AN AMMONIA ANTAGONIST HAVING ONLY HYDROGEN BOND ACCEPTOR PROPERTIES

CROSS-REFERENCE TO RELATED APPLICATIONS

This application claims priority from U.S. provisional application Ser. No. 60/034,440, the disclosusre of which is incorporated herein by reference filing date Dec. 23, 1996.

BACKGROUND OF THE INVENTION

Field of the Invention

This invention relates to an improvement in the process for recovery of metals from aqueous ammoniacal solutions wherein the metal values in the aqueous ammoniacal solution is extracted by contact with a water insoluble extractant solution in a water immiscible hydrocarbon solvent and subsequently stripped with an aqueous acid solution to strip the extracted metal values from the water immiscible organic hydrocarbon phase, the improvement wherein the extractant organic phase contains an ammonia antagonist which is a hydrogen bond acceptor, as distinguished from a hydrogen bond donor. The use of these ammonia antagonists, with either phenolic ketoxime or aldoxime extractants results in a significant reduction in chemically loaded ammonia from the aqueous ammoniacal solution containing the metal values.

In the typical extraction process of a metal from an aqueous solution containing the metal values, the aqueous solution containing the metal values is contacted by a solution of a water insoluble extractant capable of extracting the desired metal, in a water immiscible hydrocarbon solvent. After contact for a sufficient time to extract at least a portion of the metal values, the hydrocarbon solvent phase, now loaded or containing the extracted metal values, is separated from the aqueous solution phase from which the metal values have been extracted, due to the immiscibility of the organic and aqueous phases. The loaded organic phase is then typically contacted with an aqueous stripping solution thereby forming two phases again, (a) an aqueous strip phase, now containing metal values stripped from the organic extractant phase, and (b) an organic phase from which the metal values have been stripped. Again the organic and aqueous phases are separated due to immiscibility of the phases. The metal is then recovered from the metal loaded aqueous strip phase, by conventional means, such as electrowinning, precipitation or other means suitable to the particular metal, generally electrowinning being the preferred recovery means.

Both acid and ammoniacal aqueous solutions have been employed as stripping solutions in the past, one commercial process in the recovery of nickel employing an ammoniacal aqueous stripping solution.

The organic extractant currently employed commercially in extraction of metals such as copper, nickel and zinc are the phenolic oxime extractants. In the process, particularly with aldoxime extractants, it is often desirable to include in the organic extractant phase an equilibrium modifier, to provide for the most efficient extraction and "net transfer" of the metal being recovered. In the process there is a transfer of metal in the extraction stage from the aqueous feed solution to the organic extractant phase, followed by a second metals transfer from the organic phase to the aqueous strip solution phase, the two metal transfers representing the "net metal transfer" of the process. Effectively "net transfer" can be determined by observing the difference between the extraction isotherms and the strip points.

Typically equilibrium modifiers employed with the phenolic oxime extractants in the process have generally been various alcohols and esters.

DESCRIPTION OF THE INVENTION

In this description, except in the operating examples or where explicitly otherwise indicated, all numbers describing amounts of ingredients or reaction conditions are to be understood as modified by the word "about".

Briefly, the present invention is an improvement in the process of extraction of metals from aqueous ammoniacal solutions in which an aqueous ammoniacal solution containing the metal values is:

(1) contacted with an extractant reagent comprised of a water insoluble oxime extractant for the metal dissolved in a water immiscible hydrocarbon solvent to extract metal values from the aqueous ammoniacal solution to provide an organic phase containing the metal values and an aqueous phase from which metal values have been extracted;

(2) separating the immiscible organic phase containing metal values from the aqueous phase;

(3) contacting the organic phase with an aqueous stripping solution to strip metal values from the organic phase into the aqueous stripping solution;

(4) separating the immiscible aqueous stripping solution now containing metal values from the organic phase from which metal values have been stripped; and (5) recovering the metal values from the aqueous stripping solution.

In the past in such a process where the original feed or leach aqueous solution containing the metal values is an aqueous ammoniacal solution, the process resulted in significant amounts of ammonia to be loaded along with metal values into the organic phase. The ammonia must then be removed from the organic phase, at a cost of ammonia the system and a cost of acid required to neutralize the ammonia carried in the organic phase by a scrub section.

It has now been discovered that when an ammonia antagonist is employed along with the oxime extractant, which may also act as an equilibrium modifier, to provide the most efficient net transfer of the metal values in the overall extraction process, particularly where the extractant is a strong extractant such as an aldoxime extractant for the metal, a significant reduction in the chemically bonded ammonia results, thereby providing reduced cost of operation, minimizing, if not eliminating, the scrubbing of the organic phase with a weakly acidic solution. Thus, the ammonia antagonist is employed in an amount effective to provide as significant reduction in the ammonia in the organic phase also when employed in an effective amount with a ketoxime extractant. The ammonia antagonist is a compound which may be characterized as a pure hydrogen bond acceptor compound. By "pure hydrogen bond acceptor" is meant that the compound is "only" a hydrogen bond acceptor compound in contrast to compounds which are hydrogen bond donors or a mixed hydrogen bond donor and acceptor. Mixed hydrogen bond donor and acceptor compounds can be illustrated by alkyl phenols, such as nonyl phenol or alcohols such as tridecanol, each of which is a mixed hydrogen bond donor and acceptor. While the ammonia antagonist useful with aldoxime strong extractants, in that they may also act as an equilibrium modifier to provide efficient net transfer, the ammonia antagonist is also useful with the weaker oxime extractant, such as the ketoxime extractants, in that significant reduction in ammonia transfer to the organic phase occurs, though equilibrium modifier properties may not be necessary in the case of the ketoxime extractants. Thus, in the improved process of the present invention, there are employed ammonia antagonist compounds which are "non-hydrogen bond donating" and are only "hydrogen bond accepting" compounds.

It was found that in the case of Ni, the use of an ammonia antagonist, which is only a hydrogen bond acceptor modifier, such as 2,2,4-trimethylpentane-1,3-diol diisobutyrate, surprisingly resulted in about a 50% reduction in the amount of ammonia transferred relative to the Ni.

Similarly the improvement of the present invention is applicable to other metals capable of extraction by oxime extractants, particularly copper and zinc where the extraction is carried out from an aqueous ammoniacal solution and the organic phase is subsequently stripped with an aqueous acidic stripping solution.

The ammonia antagonists for use in the present improvement are those organic hydrogen bond acceptor compounds containing one or more of the following organic functionalities: ester, ketone, sulfoxide, sulfone, ether, amine oxide, tertiary amide, phosphate, carbonate, carbamate, urea, phosphine oxide, and nitrile and having greater than 8 carbon atoms, up to about 36 carbon atoms and a water solubility of less than 100 ppm, more desirably less than 50 ppm and preferably less than 20 ppm. Other than 2,2,4-trimethylpentane-1,3-diol diisobutyrate, which is preferred, illustrative ammonia antagonists which are only hydrogen bond acceptor compounds are: alkyl esters and dialkyl ketones in which the alkyl groups contain from 4 to about 12 carbon atoms, such as isobutyl isooctanoate and isobutyl heptyl ketone and the dinitrile of dimerized fatty acids such as dimerized $C_{18}$ fatty acids, (Dimer Acid™ dinitrile).

For the original aqueous ammoniacal feed or leach solution for the extraction, the solution preferably contains less than about 100 g/l ammonia, more desirably less than 70 g/l and preferably less than about 40 g/l $NH_3$.

The stripping solution for removing the metal values from the organic phase in step (3) noted above is a highly acidic aqueous solution, such as an aqueous sulfuric acid solution containing above 5 g/l sulfuric acid up to about 200 g/l dependent on the particular metal to be recovered and being suitable for recovery of the metal by electrowinning, the preferred means for recovering the metal from the stripping solution.

Prior to stripping as noted in step (3) above, the organic phase is washed or scrubbed with a weakly acidic aqueous solution, such as a sulfuric acid solution at a pH of about 3 to about 6, typically about 4 to 5.

The reagents for use in the practice of the process for the extraction of nickel step include those containing one or more hydroxyaryl oxime extractants of the hydroxy aryl aldoxime or hydroxy aryl ketone oxime type. A general formula for such oximes is formula shown below;

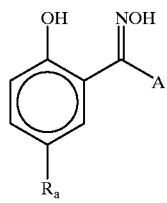

in which A may be:

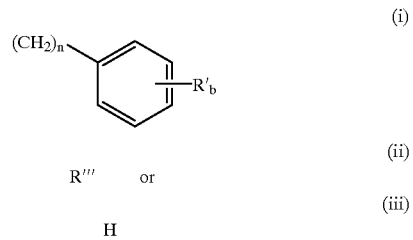

where R and R' may be individually alike or different and are saturated aliphatic groups of 1–25 carbon atoms, ethylenically unsaturated aliphatic groups of 3–25 carbon atoms or OR" where R" is a saturated or ethylenically unsaturated aliphatic group as defined; n is 0 or 1; a and b are each 0, 1, 2, 3, 4, with the proviso that both are not 0 and the total number of carbon atoms in $R_a$ and $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ and R''' is from 3–25. Preferred compounds where A is (i) above are those in which a is 1, b is 0, R is a straight or branched chain alkyl group having from 7 to 12 carbon atoms and where R is attached in a position para to the hydroxyl group. Among those, the more preferred compounds are those wherein R''' is methyl and R and a are as designated. Compounds wherein n has a value of 0 (i.e. hydroxybenzophenone oxime compounds) may suitably be prepared according to methods disclosed in Swanson U.S. Pat. Nos. 3,952,775 and 3,428,449. By reason of ready solubility in organic diluents commonly employed in solvent extraction and desirable properties of complexes of the compounds with nickel preferred benzophenone compounds are those having a single alkyl group of 7–12 carbon atoms in a position para to the hydroxyl group, in which the alkyl group is a mixture of isomers. Examples of such compounds are 2-hydroxy-5-nonylbenzophenone oxime and 2-hydroxy-5-dodecyl benzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) may suitably be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type may suitably be prepared according to the procedures disclosed in UK Patent 1,322,532. As noted with regard to the benzophenone and phenyl benzyl ketone compounds noted above, the preferred compounds of this type are also those having an isomeric mixture of 7 to 12 carbon alkyl groups as a single substituent on the ring para to the hydroxyl group. Also preferred are those in which the R'" alkyl group is methyl. Illustrative of such preferred compounds where A is $C_6H_5$, $CH_3$ is 2-hydroxy-5-nonylphenyl methyl ketone oxime manufactured through the use of commercial nonylphenol.

Hydroxy aryl aldoxime extractants which are employed are those in which A is H. These hydroxy benzaldoximes, (also called "salicylaldoximes"), may suitably be prepared according to methods described in Ackerley et al U.S. Pat. Nos. 4,020,105 or 4.020,106 or by oximation of aldehydes prepared according to Beswick U.S. Pat. No. 4,085,146. Again preferred compounds are those having an isomeric mixture of isomeric 7 to 12 carbon alkyl groups as a single substituent para to the hydroxyl group mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred, the most preferred for the purposes of the present invention where A is H, being the nonyl and dodecyl compounds.

Reagents may include a single extractant chemical as illustrated above or may comprise mixtures of different aldoxime or ketoxime extractants of the type illustrated in U.S. Pat. Nos. 4,507,268, 4,544,532 AND 4,582,689.

As indicated earlier, the oxime reagent which is water insoluble, is dissolved in a water-immiscible liquid hydrocarbon solvent and the resulting organic solution is contacted with the metal containing aqueous phase to extract at least a portion of the metal values into the organic phase. The phases are then separated and the metal values are stripped from the loaded organic (LO) phase by use of an aqueous stripping medium. Prior to stripping, it is not unusual to wash the organic phase, particularly where trace metals may be loaded on the organic extractant. One or more wash stages may accordingly be employed depending on any trace metals present, the amount of entrainment and the required purity of the final metal loaded stripping solution.

In the process of extraction a wide variety of water immiscible liquid hydrocarbon solvents can be used in the copper recovery process to form the organic phase in which the diketone extractant is dissolved. These include aliphatic and aromatic hydrocarbons such as kerosenes, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 1300 Fahrenheit and higher, preferably at least 1500 and solubilities in water of less than 0.1% by weight. The solvents are essentially chemically inert. Representative commercially available solvents are Chevron™ ion exchange solvent (available from Standard Oil of California) having a flash point of 195° Fahrenheit; Escaid™ 100 and 110 (available from Exxon™-Europe) having a flash point of 180° Fahrenheit; Norpar™ 12 (available from Exxon-USA) with a flash point of 160° Fahrenheit; Conoco™ C1214 (available from Conoco) with a flash point of 160° Fahrenheit; and Aromatic 150 (an aromatic kerosene available from Exxon-USA having a flash point of 150° Fahrenheit), and other various kerosenes and petroleum fractions available from other oil companies.

In the process, the volume ratios of organic to aqueous (O:A) phase will vary widely since the contacting of any quantity of the oxime organic solution with the nickel containing aqueous ammoniacal solution will result in the extraction of nickel values into the organic phase. For commercial practicality however, the organic (O) to aqueous (A) phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures and pressure although higher and lower temperatures and pressures are entirely operable. It is preferable to strip at elevated temperatures. While the entire operation can be carried out as a batch operation, most advantageously the process is carried out continuously with the various streams or solutions being recycled to the various operations in the process for recovery of the nickel, including the leaching, extraction and the stripping steps.

In the extraction process, the organic solvent solutions may contain the oxime extractant typically in an amount of about 20–30% by weight, generally on a volume/volume percentage (v/v%) with respect to the solvent of about 10–40 v/v%, typically about 20–35 v/v%.

After stripping of the metal values from the organic phase by the aqueous stripping solution and separation of the organic and aqueous stripping phase, the metal may be recovered by conventional recovery processes, including, but not limited to, precipitation and electrowinning.

Electrowinning is typically the preferred means of recovery of the metal from solutions suitable for electrowinning, generally highly acidic aqueous solutions, such as a sulfuric acid solution containing greater than about 5 to about 200 g/l sulfuric acid, dependent on the particulr metal, which is preferred as the aqueous acidic stripping solution to remove the metal values from the organic phase.

As noted earlier, the organic phase is washed or scrubbed prior to stripping, with a weakly acidic aqueous solution. The purpose of this is to neutralize any entrained ammonia which might be carried over to, and contaminate, the highly acidic stripping solution and potentially interfering with the electrowinning of the metal from the stripping solution.

The invention can be further illustrated by means of the following examples.

EXAMPLE I

Solutions were prepared to be 0.46 in an oxime, either 2-hydroxy-5-nonylacetophenone oxime (ketox) 5-nonylsalicylaldoxime (C9Aldox) or 5-dodecylsalicylaldoxime (C12 Aldox) dissolved in a hydrocarbon diluent (Kerosene—Conoco 170E™). In addition the following solutions were prepared:

Solution A: 0.46 M in C12 Aldox and 0.19 in tridecyl alcohol in Conoco 170E;

Solution B: 0.46 in Ketox and 0.066M in 2,2,4-trimethylpentane-1,3-diol diisobutyrate in Conoco 170E;

Solution C: 0.46M in C9 Aldox and 0.275M in isobutyl isooctanoate in Conoco 170E;

Solution D: 0.46 M in C9 Aldox and 0.275 M isoctanoate in Conoco 170 E;

Solution E: 0.46 M, in C9 Aldox and 0.33 M in isobutyl heptyl ketone in Conoco 170 E;

Solution F: 0.46 M in C9 Aldox and 0.16 M in Dimer Acid dinitrile in Conoco 170 E;

An aqueous ammoniacal nickel feed solution was prepared by dissolving 31.3 grams of nickel carbonate, 153.2 g. of ammonium carbonate and 24.08 ml. of concentrated ammonium hydroxide in 1 liter of deionized (DI) water. The nickel concentration was adjusted to 12 g/l. Samples of the organics were contacted at an O/A of 1 with the feed to give a nickel loaded organic by shaking for 5 minutes. The phases were allowed to separate and the aqueous raffinate was removed. The loaded organic was then centrifuged and then filtered through phase separation paper to remove any aqueous entrainment. A sample of the loaded organic was then contacted with a pH 4.99 aqueous buffer prepared by dissolving 8.166 g of potassium hydrogen phthalate in 200 ml of water, adding 180 ml of 0.1051 N NaOH, and then diluting to 400 ml of total volume. After shaking the loaded organic for 30 minutes with the buffer, the phases were separated. In some cases, it was necessary to centrifuge the mixture to obtain a clean aqueous phase free of entrained organic. The residual acid in the aqueous buffer was then back titrated with a 0.1051 N NaOH solution The level of nickel in the aqueous buffer after contact with the organic was also determined. From this data, the amount of acid consumed in neutralizing ammonia washed out of the organic phase was then calculated after correction for acid consumed in stripping trace amounts of nickel off the organic. The results are summarized in the following TABLE I.

TABLE I

| Organic | $[Ni]_{org}$ (gpl) | Mole of $NH_3$/mole of Ni |
|---|---|---|
| Ketox | 12.09 | 0.1295 |
| C9 Aldox | 12.24 | 0.1550 |
| Soln A | 12.14 | 0.1658 |
| Soln B | 13.21 | 0.0624 |
| Soln C | 13.43 | 0.0510 |
| Soln D | 13.24 | 000524 |
| Soln E | 13.41 | 0.0831 |
| Soln F | 13.49 | 0.0762 |

The data clearly shows that the addition of a compound which can serve only as a hydrogen bond acceptor serves to depress ammonia loading on the organic.

EXAMPLE II

The purpose of this example was to determine the effect of 2,2,4-trimethylpentane-1,3-diol diisobutyrate (TXIB) on ammonia loading for ketoxime (Ketox) and aldoxime (C9 Aldox).

The organic was prepared fresh at 30 v/v%, then adjusted such that the max loads were the same for all tests. The TXIB was added before the max load adjustments. All of the reagents were adjusted to a max load of 16.43 g/l Cu. The organic was contacted with an equal volume of feed solution and shaken for 5 minutes.

The nickel feed contained 11.84 g/l Ni and the copper feed was a synthetic feed containing 25 g/l Cu. The aqueous was then drained and the organic centrifuged for 30 minutes. The organic was then decanted and then gravity filtered through PS-1 paper. The organic was washed with a pH 4.9 buffer solution at a 1:1 ratio, by volume. The mixture was mechanically shaken for 30 minutes and both phases were filtered. The results are summarized in the following TABLES IIA AND IIB

TABLE IIA

| Copper | g/l Cu in organic | Moles of $NH_3$ transferred per mole of Cu extracted |
|---|---|---|
| Ketox + 0.915 g TXIB | 16.54 | 0.005 |
| Ketox + 5.5 g TXIB | 16.66 | 0.004 |
| Ketox + 11 g TXIB | 16.58 | 0.003 |
| C9 Aldox + 0.915 g TXIB | 16.28 | 0.011 |
| C9 Aldox + 5.5 g TXIB | 16.43 | 0.005 |
| C9 Aldox + 11 g TXIB | 16.60 | 0.005 |

TABLE IIB

| Nickel | g/l NI in organic | Moles of $NH_3$ transferred per mole of Ni extracted |
|---|---|---|
| Ketox + 0.915 g TXIB | 11.96 | 0.049 |
| Ketox + 5.5 g TXIB | 11.74 | 0.018 |
| Ketox + 11 g TXIB | 11.48 | 0.007 |
| C9 Aldox + 0.915 g TXIB | 11.98 | 0.052 |
| C9 Aldox + 5.5 g TXIB | 11.97 | 0.025 |
| C9 Aldox + 11 g TXIB | 11.71 | 0.013 |

The foregoing TABLES IIA and IIB show that for both copper and nickel, ammonia transfer decreases with increasing TXIB concentration. The greatest differences are seen with nickel.

Similar results may be seen with zinc in extractions from aqueous ammoniacal solutions.

EXAMPLE III

Additional testwork was conducted in the laboratory, both batch tests and a laboratory circuit run, showing that addition of hydrogen bond acceptors to the organic phase results in ammonia carried on the loaded organic.

The results of the batch tests is described in TABLE IIIA below. The experiments were carried out in the same fashion as described in the nickel test work above with the exception that the feed solution was replaced with an ammoniacal copper solution made up of deionized water to contain 30 g/l copper, 1.5 g/l zinc 38 g/l ammonia and 55 g/l sulfate.

TABLE IIIA

| Organic Phase | $[Cu]_{org}$ (g/l) | Mole of NH3/Mole of Cu |
|---|---|---|
| Ketox | 15.42 | 0.0150 |
| Ketox + TXIB | 15.67 | 0.0066 |
| C12 Aldox | 15.24 | 9.0139 |
| C12 Aldox + TXIB | 15.71 | 0.0096 |
| C9 Aldox | 15.09 | 0.0175 |
| C9 Aldox + TXIB | 15.31 | 0.0109 |

In all cases, adding a hydrogen bond acceptor, such TXIB to the organic resulted in significant reductions in the amount of ammonia transferred to the loaded organic.

A laboratory continuous circuit comparison of Ketox with a mixture of Ketox plus TXIB was carried out. Organic A was prepared to give 40%(v/v) Ketox into Conoco 170E and Organic B was prepared to give 40%(v/v) Ketox and 24.4 g/l of TXIB in Conoco 170E. Organic B was also aged by contacting it for one week at 45° C. at an organic to aqueous ration of 1 with a portion of the aqueous feed solution. The ammoniacal copper feed solution was prepared in the same fashion as that used in the batch testwork described above. The circuit consisted of 2 stages of extraction, a coalescer, a loaded organic surge tank, 1 loaded organic wash stage and 1 strip stage. The strip aqueous consisted of an aqueous solution containing 35 g/l copper and 170 g/l sulfuric acid. The aqueous wash consisted of 20 g/l sodium sulfate with its pH controlled at pH 4.5 by the addition of a solution containing 8.3 g/l of sulfuric acid and 20 g/l sodium sulfate. Each stage was fitted with an immersion heater inserted in the mixer box so that the temperature could be controlled at 45° C. The coalescer consisted of a column 1.6 in. I.D.×20.5 in. high packed with a layer of glass beads (115 ml volume) and a layer of glass wool (180 ml volume) with 85 ml of free volume in the sump. The wash stage was fitted with a pH controller set to maintain the pH at approximately pH 4.5. Retention times in the extraction and wash stages was three minutes. The strip stage was fitted with a dual mixer configuration in series so that the average mixer retention time was 6 minutes.

The results of the circuit comparison are summarized in TABLE IIIB. The acid consumed in the wash stage is presented in terms of kg of sulfuric acid consumed in the wash stage per metric ton of copper transferred. The value has been corrected to take into account any acid consumption resulting from stripping a portion of the copper off the loaded organic phase. The results presented are the average of several measurements with the circuit at equilibrium. Aqueous entrainments in the organic were measured by centrifugation. The aqueous entrainment in the loaded organic exiting the El extraction stage typically were in the range of 1700 to 2000 ppm and after passing through the coalescer averaged less than 25 ppm.

TABLE IIIB

|  | Run A | Run B |
| --- | --- | --- |
| Organic | A | B |
| g/l Cu (Loaded Organic) | 18.66 | 20.2 |
| g/l Cu (Washed Loaded Organic) | 18.53 | 20.1 |
| g/l Cu (Stripped Organic) | 2.65 | 2.69 |
| g/l Cu (Aqueous Wash) | 0.002 | 0.402 |
| g $H_2SO_4$/l of organic | 1.396 | 0.575 |
| kg $H_2SO_4$/mt of Cu | 87.2 | 32.95 |

In terms of acid consumption in the wash stage per metric ton of copper transferred to electrowinning, acid consumption with TXIB was only 38% of that without TXIB.

The foregoing clearly shows that when employing an ammonia antagonist, which is only a hydrogen bond acceptor compound, in the organic phase, and stripping the organic phase with a highly acidic aqueous solution to remove the metal values from the organic phase after washing of the organic phase with a weakly acidic aqueous solution to neutralize and eliminate the minimal amount of entrained ammonia, so as not to contaminate or have any ammonia carry over to the preferred stripping solution, which is a highly acidic aqueous solution from which the metal can be recovered efficiently by electrowinning. A further advantage of the presently improved process is that with the ammonia antagonist present there is also an improved rejection of any Co and Zn which may be present in Ni leach solutions containing Ni, in which small amounts or traces of Co and Zn are frequently found along with the Ni.

What is claimed is:

1. In a process of extraction of a metal from an aqueous ammoniacal solution containing the metal values, comprising (a) contacting the aqueous ammoniacal solution with an extraction reagent comprised of a water insoluble hydroxy aryl oxime extractant for the metal, in solution in a water immiscible hydrocarbon solvent to provide an organic phase, now containing metal values, and an aqueous phase from which the metal values have been extracted;

(b) separating the aqueous and organic phases;

(c) contacting the organic phase with an aqueous stripping solution to provide an aqueous strip phase, now containing metal values and an organic phase, from which the metal values have been stripped;

(d) separating the organic phase from the aqueous strip phase; and (e) recovering the metal from the aqueous stripping solution; the improvement wherein (i) the extraction reagent contains an ammonia antagonist having only hydrogen bond acceptor properties and having a water solubility of less than 100 ppm; (ii) said stripping solution is a highly acidic aqueous solution; and (iii) the organic phase is washed with a weakly acidic aqueous solution prior to stripping with the highly acidic stripping solution in order to neutralize any entrained ammonia carry over to the highly acidic aqueous stripping solution.

2. A process as defined in claim 1 wherein said metal is selected from the group consisting of nickel, copper and zinc.

3. A process as defined in claim 1, wherein said ammonia antagonist is an organic hydrogen bond acceptor compound containing organic functionalities of ester, ketone, sulfoxide, sulfone, ether, amine oxide, tertiary amide, phosphate, carbonate, carbamate, urea, phosphine oxide and nitrile and having greater than 8 carbon atoms, up to about 36 carbon atoms.

4. A process as defined in claim 3, wherein said ammonia antagonist is selected from the group of alkyl esters and dialkyl ketones in which the alkyl group contains from 4 to about 12 carbon atoms, and the dinitrile of a dimerized fatty acid.

5. A process as defined in claim 4, wherein said ammonia antagonist is selected from the group consisting of 2,2,4-trimethylpentane-1, 3-diol diisobutyrate, isobutyl isooctanoate, isobutyl heptyl ketone and the dinitrile of a dimerized 18 carbon atom fatty acid.

6. A process as defined in claim 3, wherein the ammonia antagonist is 2,2,4-trimethylpentane-1,3-diol diisobutyrate.

7. A process as defined in claim 1, wherein the hydroxy aryl oxime is a ketoxime.

8. A process as defined in claim 1, wherein the hydroxy aryl oxime is an aldoxime.

9. A process as defined in claim 1, in which the hydroxy aryl oxime has the formula:

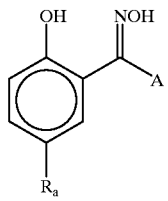

in which A is selected from the group

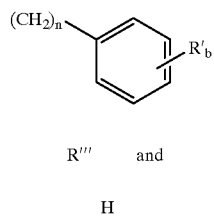

(i)

R‴ and (ii)

H (iii)

where R and R' may be individually alike or different and are saturated aliphatic groups of 1–25 carbon atoms, ethylenically unsaturated aliphatic groups of 3–25 carbon atoms or OR″ where R″ is a saturated or ethylenically unsaturated aliphatic group as defined; n is 0 or 1; a and b are each 0, 1, 2, 3, or 4 with the proviso that both are not 0 and the total number of carbon atoms in $R_a$ and $R'_b$ is from 3–25, R‴ is a saturated aliphatic group of 1–25 carbon atoms or an ethylenically unsaturated aliphatic group of 3–25 carbon atoms with the proviso that the total number of carbon atoms in $R_a$ and R‴ is from 3–25.

10. A process as defined in claim 9, wherein the hydroxy aryl oxime is a ketoxime selected from the group consisting of 2-hydroxy-5-alkyl benzophenone oxime in which the alkyl group contains from 7 to 12 carbon atoms and 2-hydroxy-5-nonyl acetophenone oxime.

11. A process as defined in claim 9, in which the hydroxy aryl oxime is an alkyl salicylaldoxime in which the alkyl group contains from 7 to 12 carbon atoms.

12. A process as defined in claim 8, wherein the hydroxyaryl oxime is a salicylaldoxime selected from the group consisting of 5-nonylsalicylaldoxime and 5-dodecylsalicylaldoxime.

13. A process as defined in claim 1, wherein the water immiscible hydrocarbon solvent is selected from the group consisting of kerosene, benzene, toluene and xylene.

14. A process as defined in claim 13, wherein the hydrocarbon solvent is kerosene, the ammonia antagonist is 2,2,4-trimethylpentane-1,3-diol diisobutyrate, and the extractant is an oxime extractant selected from the group consisting of 5-nonylacetophenone oxime, a 2-hydroxy-5-alkyl benzophenone oxime in which the alkyl group contains from about 7 to about 12 carbon atoms and an alkylsalicylaldqxime in which the alkyl group contains from about 7 to about 12 carbon atoms.

15. In a process of extraction of a metal from an aqueous ammoniacal solution containing the metal values, comprising (a) contacting the aqueous ammoniacal solution with an extraction reagent comprised of a water insoluble hydroxy aryl oxime extractant for the metal, to provide an organic phase, now containing metal values, and an aqueous phase from which metal values have been extracted;

(b) separating the aqueous and organic phases;

(c) contacting the organic phase with an aqueous stripping solution to provide and aqueous strip phase, now containing metal values, and an organic phase from which metal values have been stripped;

(d) separating the organic phase from the aqueous strip phase; and (e) recovering the metal from the aqueous stripping solution; the improvement wherein (i) the extraction reagent contains an ammonia antagonist having only hydrogen bond acceptor properties and a water solubility of less than 50 ppm; (ii) said stripping solution is an aqueous sulfuric acid solution containing up to 200 g/l sulfuric acid; and (iii) the organic phase is washed with a weak aqueous sulfuric acid solution having a pH of about 3 to about 6 to neutralize any entrained ammonia carry over to the stripping solution.

16. A process as defined in claim 15, wherein the metal is recovered in step (e) by electrowinning.

17. A process as defined in claim 16, wherein the ammonia antagonist is selected from the group of alkyl esters and dialkyl ketones in which the alkyl group contains from 4 to about 12 carbon atoms, and the dinitrile of a dimerized fatty acid; and wherein the extractant is an hydroxy aryl oxime.

18. A process as defined in claim 17, wherein said ammonia antagonist is selected from the group consisting of 2,2,4-trimethylpentane-1,3-diol diisobutyrate, isobutyl isooctanoate, isobutyl heptyl ketone and the dinitrile of a dimerized 18 carbon atom fatty acid.

19. A process as defined in claim 17, wherein the ammonia antagonist is 2,2,4-trimethylpentane-1,3-diol diisobutyrate.

20. A process as defined in claim 18, wherein the extractant is an hydroxy aryl oxime.

21. A process as defined in claim 20 wherein said hydroxy aryl oxime is selected from the group consisting of a ketoxime and an aldoxime.

22. A process as defined in claim 21 wherein said ketoxime is selected from the group consisting of 2-hydroxy-5-alkyl benzophenone oxime in which the alkyl group contains from 7 to 12 carbon atoms and 2-hydroxy-5-nonyl acetophenone oxime.

23. A process as defined in claim 21 wherein the aldoxime is selected from the group consisting of 5-nonylsalicylaldoxime and 5-dodecylsalicylaldoxime.

24. A composition adapted for extracting metal values from an aqueous ammoniacal solution containing metal values upon contact with an organic hydrocarbon solvent solution thereof comprising an hydroxy aryl ketoxime and an ammonia antagonist compound having only hydrogen bond acceptor properties and a water solubility of less than 100 ppm and being selected from the group consisting of isobutyl isooctanoate, isobutyl heptyl ketone and a dinitrile of a dimerized 18 carbon atom fatty acid.

25. An organic hydrocarbon solvent solution of the composition defined in claim 24.

26. A solution as defined in claim 25 wherein said hydrocarbon solvent is kerosene.

27. A composition as defined in claim 24, wherein the ketoxime has the formula in which A is selected from the group

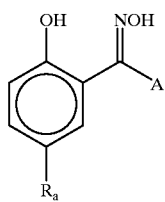

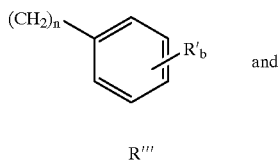

where R and R' may be individually alike or different and are saturated aliphatic groups of 1–25 carbon atoms, ethylenically unsaturated aliphatic groups of 3–25 carbon atoms or OR" where R" is a saturated or ethylenically unsaturated aliphatic group as defined; n is 0 or 1; a and b are each 0, 1, 2, 3, or 4 with the proviso that both are not 0 and the total number of carbon atoms in $R_a$ and $R'_b$ is from 3–25, R'" is a saturated aliphatic group of 1–25 carbon atoms or an ethylenically unsaturated aliphatic group of 3–25 carbon atoms with the proviso that the total number of carbon atoms in $R_a$ and R'" is from 3–25.

28. A composition as defined in claim 27, wherein the ketoxime is selected from the group consisting of 2-hydroxy-5-alkyl benzophenone oxime in which the alkyl group contains from 7 to 12 carbon atoms and 2-hydroxy-5-nonyl acetophenone oxime.

\* \* \* \* \*